(12) United States Patent
Bell

(10) Patent No.: US 12,323,085 B2
(45) Date of Patent: Jun. 3, 2025

(54) DEPLOYABLE HYBRID SOLAR POWER CHARGER

(71) Applicant: Tawaun Bell, Warner Robins, GA (US)

(72) Inventor: Tawaun Bell, Warner Robins, GA (US)

(*) Notice: Subject to any disclaimer, the term of this patent is extended or adjusted under 35 U.S.C. 154(b) by 705 days.

(21) Appl. No.: 17/572,786

(22) Filed: Jan. 11, 2022

(65) Prior Publication Data

US 2022/0224277 A1 Jul. 14, 2022

Related U.S. Application Data

(60) Provisional application No. 63/136,318, filed on Jan. 12, 2021.

(51) Int. Cl.
*H02S 10/40* (2014.01)
*H01M 10/46* (2006.01)
*H02S 30/20* (2014.01)
*H02S 40/38* (2014.01)
*H02S 40/32* (2014.01)

(52) U.S. Cl.
CPC ........... *H02S 10/40* (2014.12); *H01M 10/465* (2013.01); *H02S 30/20* (2014.12); *H02S 40/38* (2014.12); *H02S 40/32* (2014.12)

(58) Field of Classification Search
CPC .................................. H02S 10/40
USPC .......................................... 320/101
See application file for complete search history.

(56) References Cited

U.S. PATENT DOCUMENTS

| | | | |
|---|---|---|---|
| 6,870,089 B1* | 3/2005 | Gray | H01L 31/042 136/203 |
| D617,265 S | 6/2010 | Sasada et al. | |
| 8,080,975 B2 | 12/2011 | Bessa et al. | |
| 8,674,211 B1* | 3/2014 | Palmer | H02S 10/40 136/251 |
| 9,367,090 B2 | 6/2016 | Barnett et al. | |
| 9,865,903 B1* | 1/2018 | Petrella | H02J 7/35 |
| 10,236,711 B1 | 3/2019 | Miller | |
| 11,444,464 B1* | 9/2022 | Ford | G05B 19/0426 |
| 2003/0201752 A1* | 10/2003 | Locke | H02J 7/0042 320/111 |
| 2007/0049353 A1 | 3/2007 | Trozzi | |
| 2008/0210289 A1* | 9/2008 | Chen | H02S 30/20 136/244 |
| 2008/0283114 A1* | 11/2008 | Gray | H02S 40/42 136/245 |
| 2010/0097032 A1* | 4/2010 | Chou | H02J 7/0042 320/114 |
| 2010/0317413 A1 | 12/2010 | Tan | |

(Continued)

FOREIGN PATENT DOCUMENTS

WO 2017121382 A1 7/2017

*Primary Examiner* — Jerry D Robbins
(74) *Attorney, Agent, or Firm* — Thomas Horstemeyer, LLP

(57) ABSTRACT

Various embodiments for a deployable hybrid solar power charger are described. A deployable hybrid solar power charger may include a charging base comprising a first rechargeable power supply and at least one solar panel for recharging the first rechargeable power supply. The deployable hybrid solar power charger may further include a charging device detachably attached to the charging base. The charging device comprises a second rechargeable power supply and at least one connector for charging an electronic device, such as a mobile electronic device.

17 Claims, 11 Drawing Sheets

(56) References Cited

U.S. PATENT DOCUMENTS

| | | | |
|---|---|---|---|
| 2011/0101782 A1* | 5/2011 | Lyman | H01M 50/222 |
| | | | 307/66 |
| 2011/0159930 A1* | 6/2011 | Garrett | H04M 1/21 |
| | | | 455/573 |
| 2012/0080072 A1* | 4/2012 | Bullivant | H02S 40/36 |
| | | | 136/246 |
| 2012/0202094 A1* | 8/2012 | Sada | H02J 7/35 |
| | | | 429/9 |
| 2013/0084919 A1 | 4/2013 | Glynn | |
| 2014/0349591 A1 | 11/2014 | Tamatsu | |
| 2014/0375245 A1 | 12/2014 | Strawderman | |
| 2015/0061568 A1* | 3/2015 | Martinez | H02S 20/30 |
| | | | 136/246 |
| 2015/0130403 A1* | 5/2015 | Malladi | H02J 7/0042 |
| | | | 29/825 |
| 2015/0207360 A1 | 7/2015 | Adams et al. | |
| 2016/0218553 A1 | 7/2016 | He et al. | |
| 2016/0226283 A1* | 8/2016 | Nge | H02J 7/00 |
| 2017/0067682 A1* | 3/2017 | Spinks | H02S 10/40 |
| 2017/0104441 A1* | 4/2017 | Swan | H02S 30/20 |
| 2019/0072242 A1* | 3/2019 | Worman | F21L 4/08 |
| 2019/0301114 A1* | 10/2019 | Chamberland | E01F 9/692 |
| 2019/0363555 A1 | 11/2019 | Kung et al. | |
| 2019/0393835 A1* | 12/2019 | Chailertborisuth | H02S 50/10 |
| 2020/0076216 A1* | 3/2020 | Georgiades | H02J 7/342 |
| 2020/0091724 A1* | 3/2020 | Freni | G06F 1/16 |
| 2021/0135617 A1* | 5/2021 | Trichell | B23K 9/1081 |
| 2022/0115899 A1* | 4/2022 | Merritt | H02S 10/40 |
| 2024/0154437 A1* | 5/2024 | James | H02J 7/0045 |

\* cited by examiner

DEPLOYABLE HYBRID SOLAR POWER CHARGER

CROSS-REFERENCE TO RELATED APPLICATION

This application claims the benefit of and priority to U.S. Provisional Patent Application No. 63/136,318 filed Jan. 12, 2021, entitled "DEPLOYABLE HYBRID SOLAR POWER CHARGER," the contents of which being incorporated by reference in their entirety herein.

BACKGROUND

Various techniques and devices exist for recharging a mobile device. Today, battery packs are commonly carried in pockets and purses to recharge a mobile device while on the go. Power cords and wireless charging stations are used in the home to charge mobile devices and tablet computing devices. Power cords are often used for laptop computing device. It remains difficult to have a single device that can be utilized to charge a multitude of different types of devices used in the home today.

U.S. Patent Publication No. 2016/0218553 A1 to He et al. describes a charging device configured to charge a mobile device through the solar cells integrated on the mobile device. The charging device converts wall power to light energy which can be absorbed by the solar cells and then converted to electricity for storage in the rechargeable battery of the mobile device. The charging device includes a light source configured to emit a light beam having a spectrum tuned to the spectral response of the solar cells. The charging device includes a proximity sensor for detecting the presence of a mobile device within the charging device housing and responsively signaling the activation of the light source. The charging device includes logic for wirelessly communicating with the mobile device as well as controlling the charging process in various stages and aspects. The light source may be LEDs that also serve to transmit light communication signals to the mobile device."

U.S. Patent Publication No. 2010/0317413 A1 to Tan et al. describes a portable phone holder and solar charger for holding and charging a portable electronic device. The portable phone holder and charger includes a cradle portion which cradles a portable electronic device, a plug or electrical contacts that makes electrical connection with the portable electronic device, a base portion, a battery and recharging electronic circuitry, a solar panel, and a hinge that pivotally connects together the cradle portion and the base portion. The plug is adapted to engage with the portable electronic device and extends from the hinge and moves in concert along with the cradle portion when the base portion and the cradle portion are pivoted relative to each other. The cradle portion retains the portable electronic device in connection with the electrical engagement. The hinge preferably provides click stops at a plurality of positions of pivoting of the cradle portion relative to the base portion. The solar panel allows for recharging of the battery in the base portion to be recharged as well as the connected portable electronic device to be recharged.

U.S. Pat. No. 9,367,090 B2 to Barnett et al. relates to docking platforms formed in back surfaces of mobile electronic devices. Such a docking platform comprises a docking accessory cavity having a docking connection system comprising one or more docking connectors formed within the cavity, and optionally two or more electrical contacts within the cavity. The contacts electrically connected to electronics within the electronic device and constructed and arranged to allow electrical connection to detachable docking accessories. The docking connection system is operable to form detachable attachments to multiple independent docking accessories simultaneously. The cavities of the docking platforms are shaped to accommodate a broad range of docking accessories that are specially adapted to sit in a generally flush manner with the back surface of the mobile electronic device while attached to the docking connectors. One type of accessory forms an assembly with an expandable accordion attached to the docking platform.

BRIEF SUMMARY OF INVENTION

A deployable hybrid solar power charger is described that includes a charging base comprising a first rechargeable power supply and at least one solar panel for recharging the first rechargeable power supply; and a charging device detachably attached to the charging base, the charging device comprising a second rechargeable power supply and at least one connector for charging an electronic device, the second rechargeable power supply being different than the first rechargeable power supply. The at least one connector for charging the electronic device is adapted to charge a mobile phone or tablet.

The at least one solar panel comprises a first solar panel positioned on a first side of the charging base and a second solar panel positioned on a second side of the charging base. The charging base comprises a first telescoping arm for adjusting an angle of the first solar panel relative to the charging base, and a second telescoping arm for adjusting an angle of the second solar panel relative to the charging base. The charging base comprises a retractable cord for charging the first rechargeable power supply and powering the charging base.

The charging base further comprises a push button configured to extend or retract the retractable cord. The charging base comprises a bay configured to receive the charging device such that at least a portion of the charging device is nested in the bay. The bay is sized and positioned to receive the charging device and the electronic device while the charging device is coupled to a charging port of the electronic device. In some embodiments, the bay is sized and positioned to receive two charging devices and two electronic devices while the charging device is coupled to a charging port of the electronic device.

The charging base comprises a triangular shaped body. The charging base comprises a face comprising a plurality of power outlets. The power outlets comprise at least one of: a universal serial bus (USB) 2.0 power outlets; a USB-C power outlets; and an alternating current (AC) power outlets. The charging base comprises a display and processing circuitry configured to provide information relating to a charging of the charging device on the display.

The charging base comprises a first leg extending at an angle from a first side of a body of the charging base and a second leg extending at an angle from a second side of the body of the charging base, the first leg and the second leg configured to retain the charging base in an upright position. A handle recess is positioned on a top portion of the charging base. A method is described that comprises providing the foregoing.

BRIEF DESCRIPTION OF THE DRAWINGS

Many aspects of the present disclosure can be better understood with reference to the following drawings. The FIG. 1 is a front perspective view of a deployable hybrid solar power charger in accordance with various embodiments of the present disclosure.

DETAILED DESCRIPTION

The present disclosure relates to a deployable hybrid solar power charger. Solar docking stations are limited in accessibility to different types of devices. Embodiments are described herein for a power charging device that has more functionality than existing products on the market, is more portable, durable, can be used indoors and outdoors and is compatible with all electronics including international devices.

Figure 1:
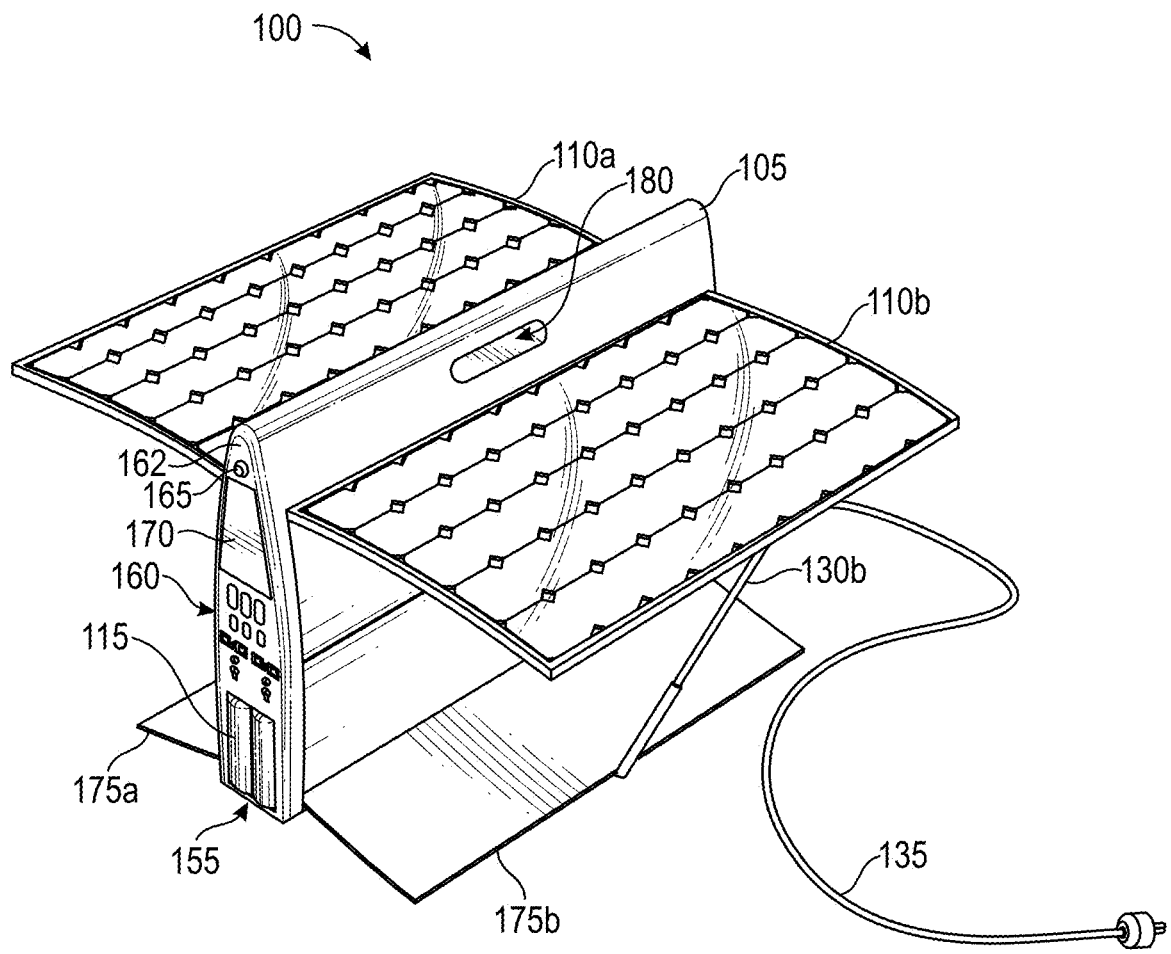
Figure 2:
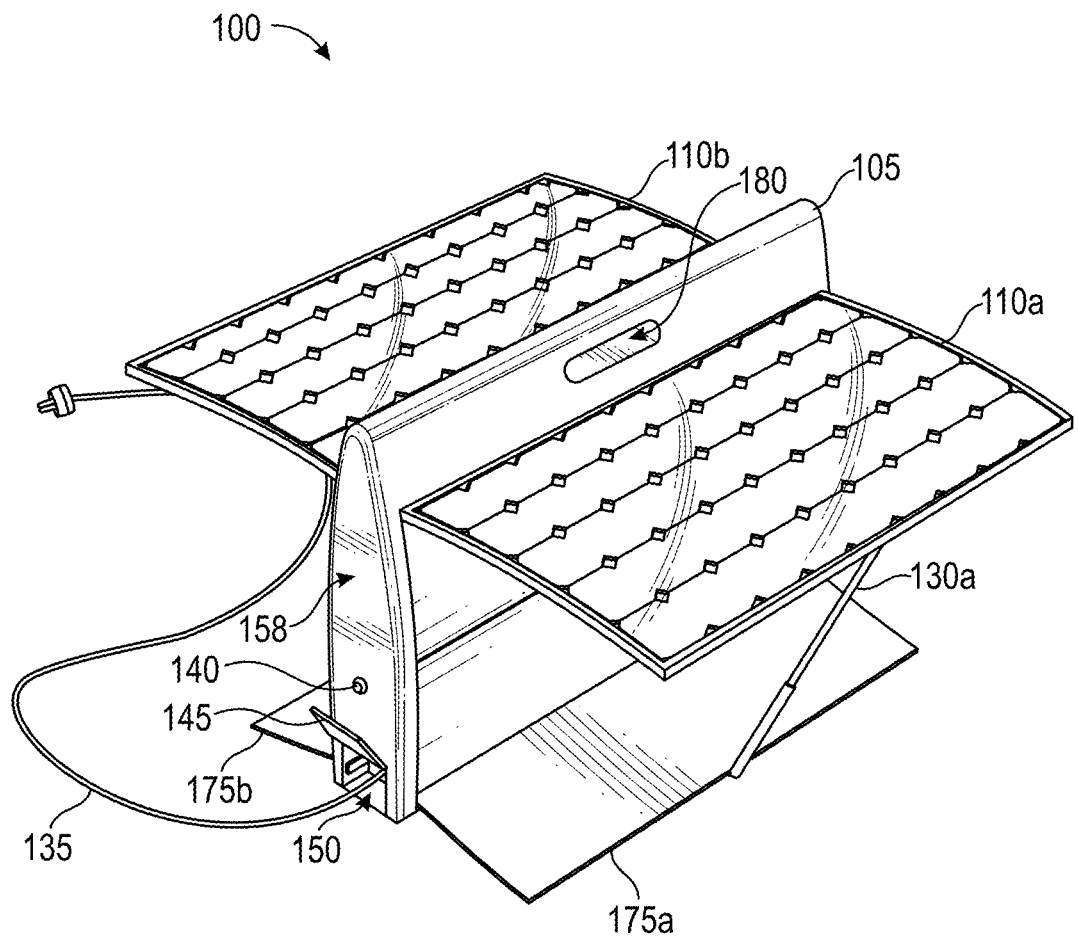
FIG. 2 is a rear perspective view of the deployable hybrid solar power charger in accordance with various embodiments of the present disclosure.
Figure 3:
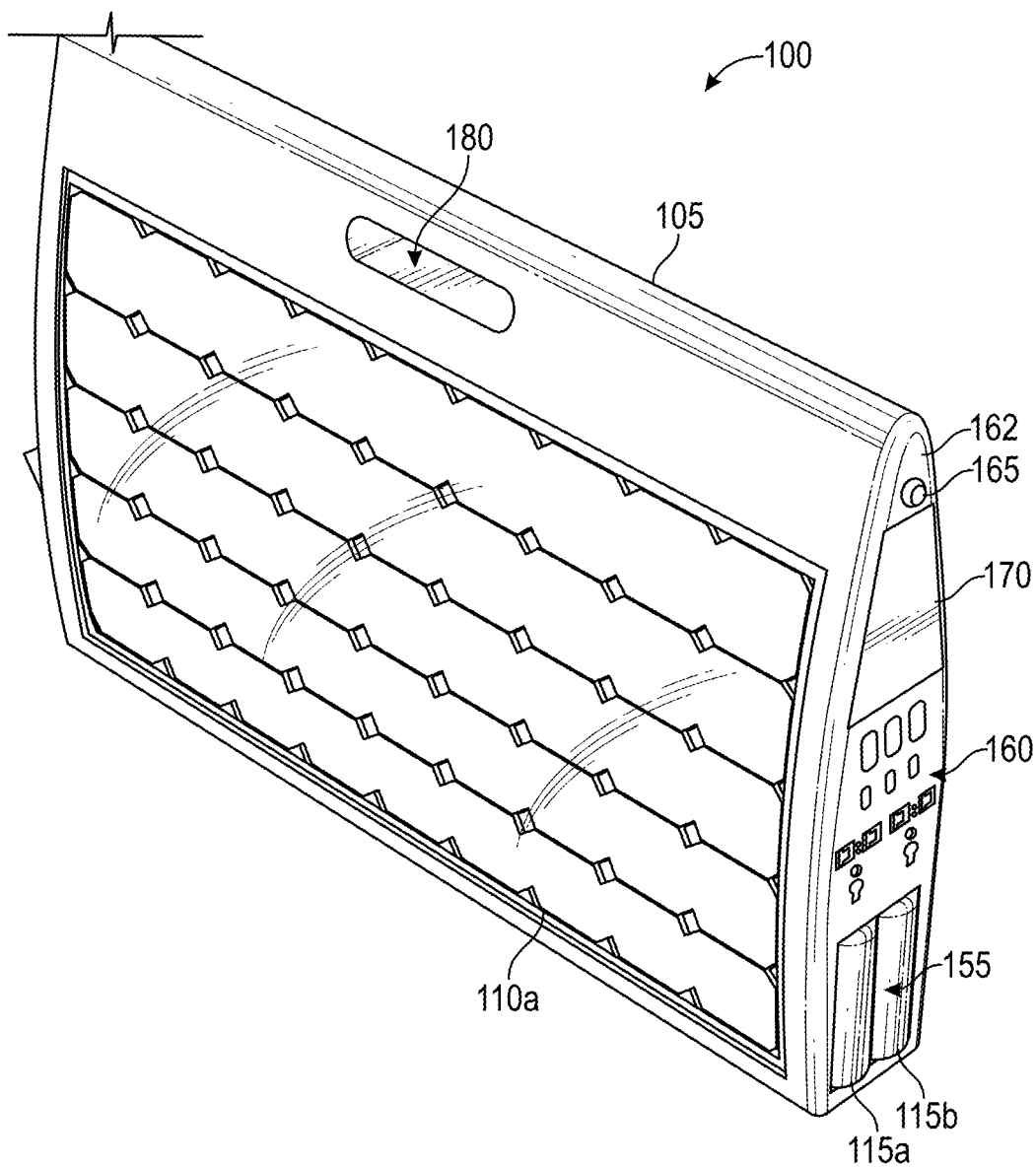
FIG. 3 is another front perspective view of the deployable hybrid solar power charger in accordance with various embodiments of the present disclosure.
Figure 4:
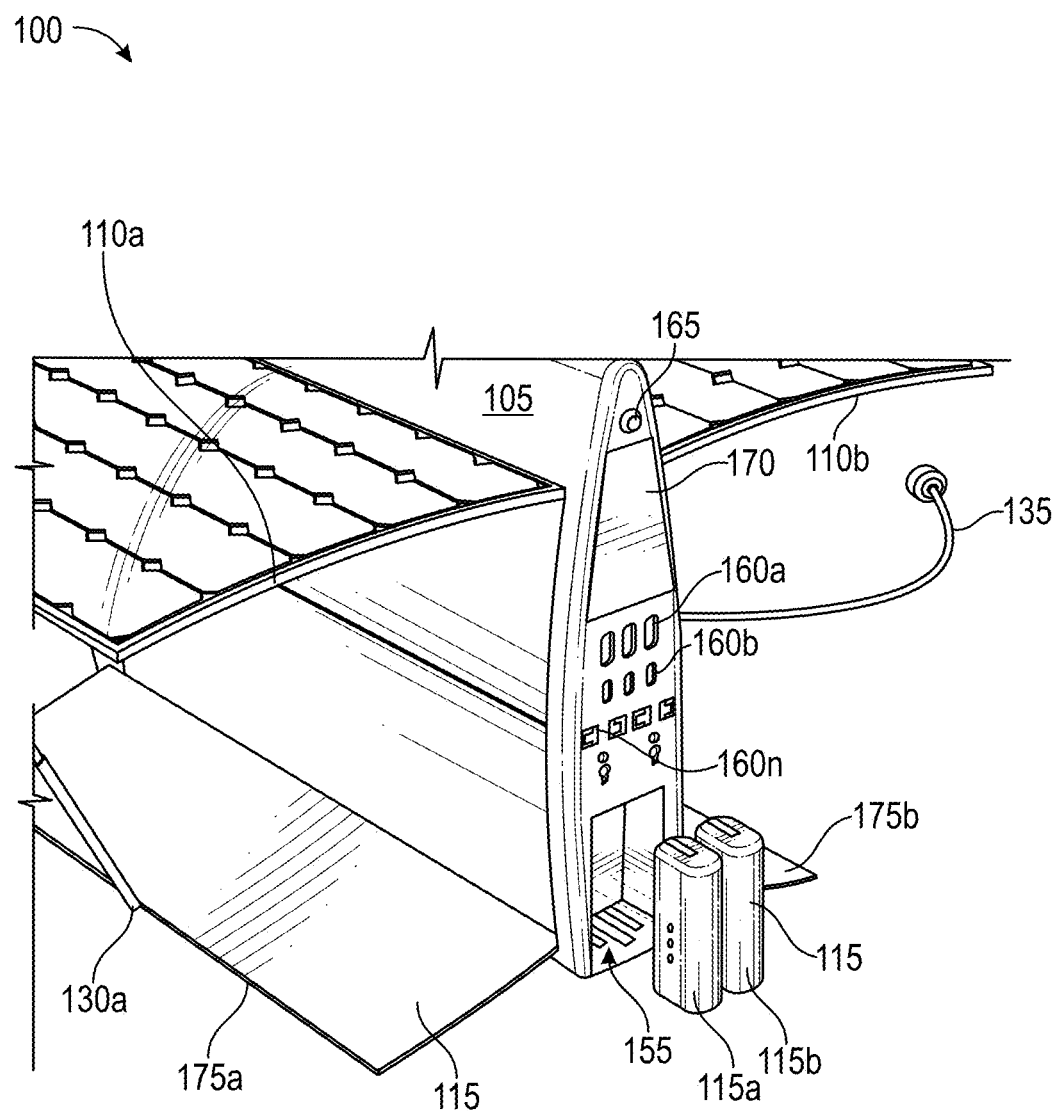
FIG. 4 is an enlarged front perspective view of the deployable hybrid solar power charger in accordance with various embodiments of the present disclosure.
Figure 5:
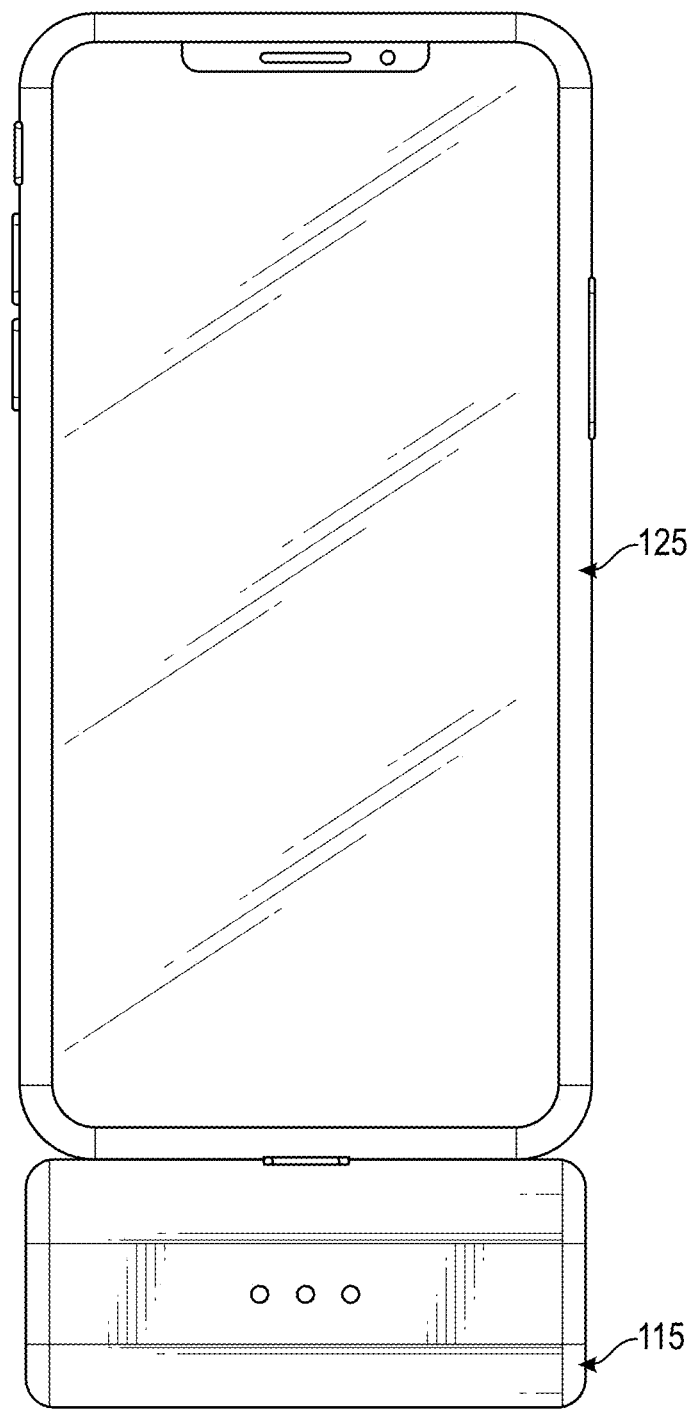
FIG. 5 is a front view of a removable charging device that operates in conjunction with the deployable hybrid solar power charger in accordance with various embodiments of the present disclosure.
Figure 6:
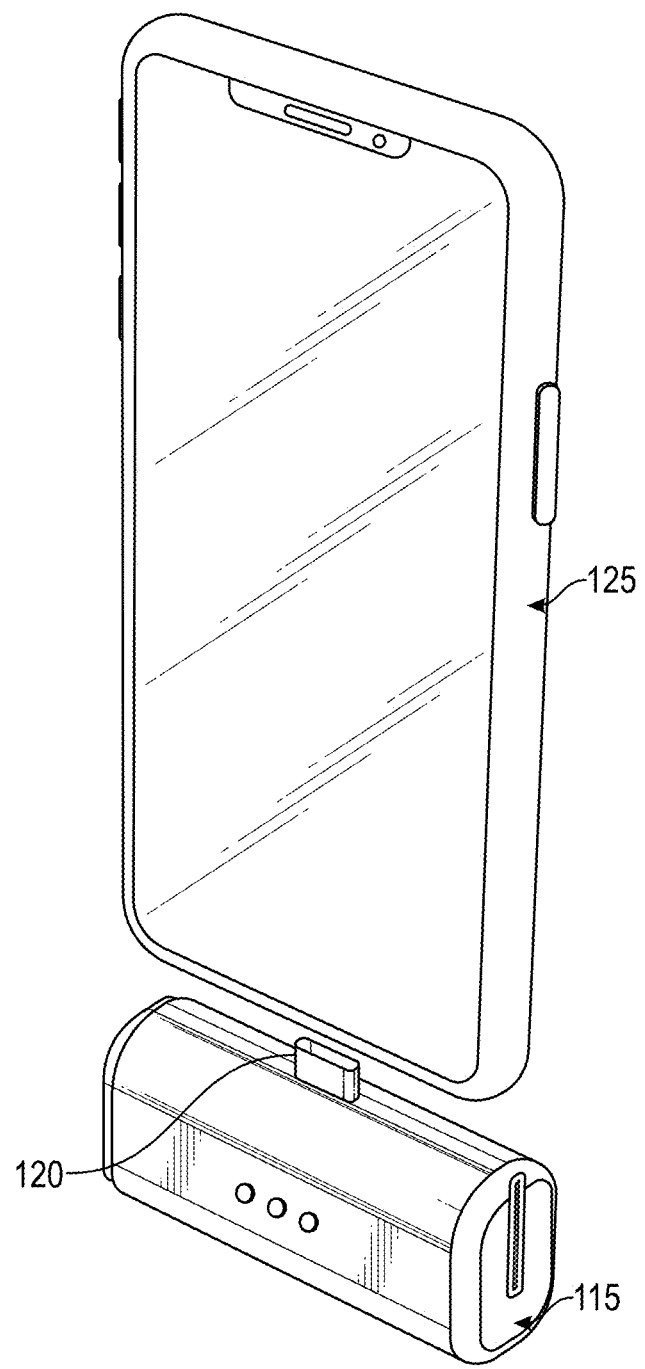
FIG. 6 is a front perspective view of a removable charging device that operates in conjunction with the deployable hybrid solar power charger in accordance with various embodiments of the present disclosure.
Figure 7:
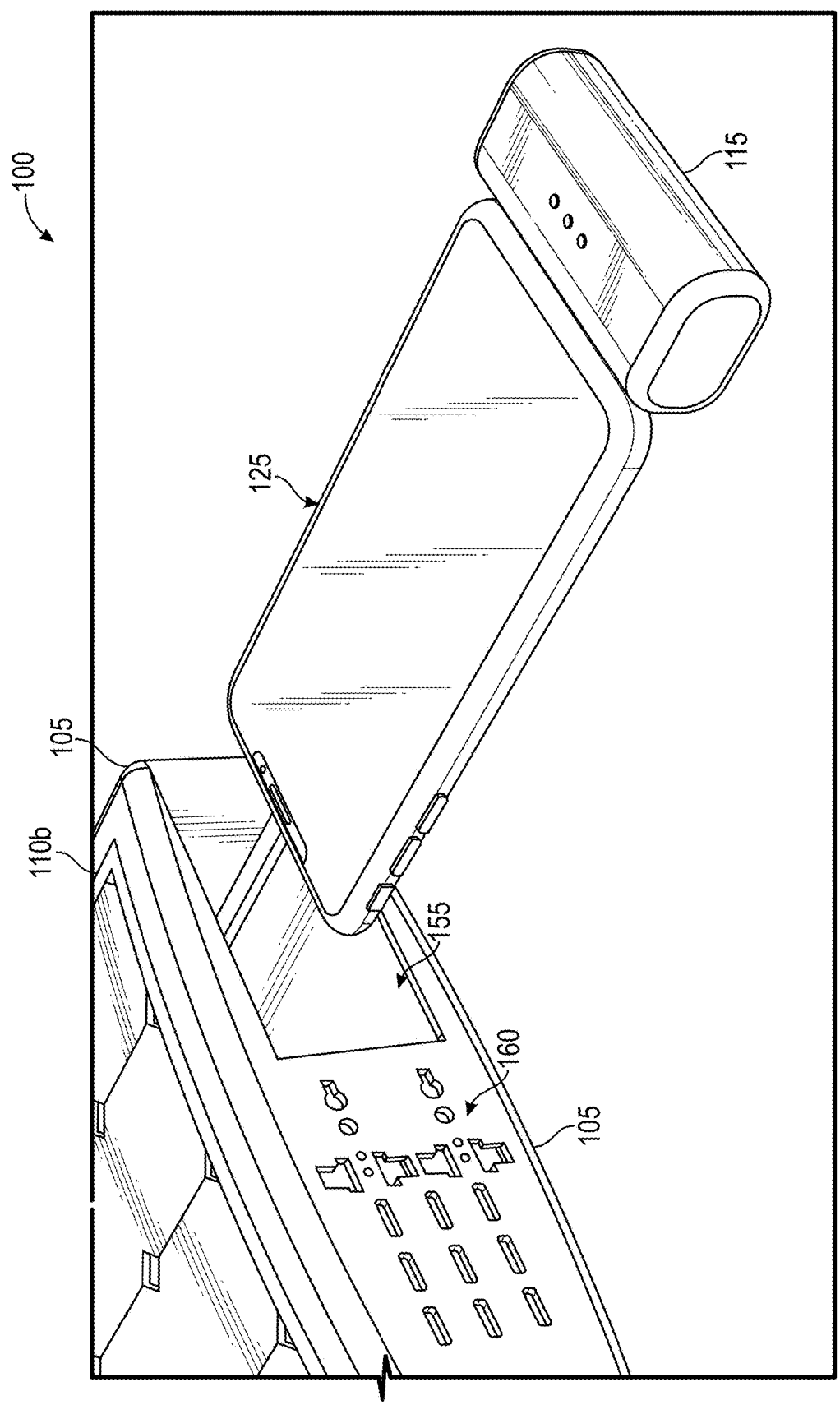
FIG. 7 is an enlarged view of a mobile device being inserted into or removed from the deployable hybrid solar power charger in accordance with various embodiments of the present disclosure.

Referring now to the drawings, FIG. 1 shows a front perspective view of a deployable hybrid solar power charger 100 and FIG. 2 shows a rear perspective view thereof in accordance with various embodiments of the present disclosure. FIG. 3 is another front perspective view of the deployable hybrid solar power charger 100, FIG. 4 is an enlarged front perspective view of the deployable hybrid solar power charger 100, and FIGS. 5 and 6 are front and perspective views, respectively, of a removable charging device 115 that operates in conjunction with the deployable hybrid solar power charger 100, FIG. 6 is a front perspective view of a removable charging device 115 that operates in conjunction with the deployable hybrid solar power charger in accordance with various embodiments of the present disclosure. FIG. 7 is an enlarged view of an electronic device 125 being inserted into or removed from the deployable hybrid solar power charger 100 in accordance with various embodiments of the present disclosure.

Referring to FIGS. 1-7 collectively, the deployable hybrid solar power charger 100 may include a charging base 105 having a housing that comprises a first rechargeable power supply (not shown) positioned therein, and one or more solar panels 110a, 110b (collectively "solar panels 110") for recharging the first rechargeable power supply. Further, the deployable hybrid solar power charger 100 may include one or more charging devices 115 configured to detachably attach to the charging base 105. The charging device 115 may include a second rechargeable power supply (not shown) being different than the first rechargeable power supply. For instance, the charging device 115 may include a 3000 MAH battery, or other suitable battery.

In some embodiments, the housing of the charging base 105 is triangular-shaped, where a bottom of the charging base 105 is wider than a top of the charging base 105. Further, the housing of the charging base 105 may be curved or arched, as shown in FIG. 1.

Further, the charging device 115 may include at least one connector 120 for charging an electronic device 125 via the second rechargeable power supply by coupling with a power supply port of the electronic device 125. To this end, the connector 120 may include a USB-A connector, a USB-C connector, an iPhone connector, or other suitable connector. The electronic device 125 may include a mobile phone, laptop, tablet, headphones, or other electronic device 125 as may be appreciated.

The first solar panel 110a may be positioned on a first side of the charging base 105 and the second solar panel 110b may be positioned on a second side of the charging base 105. Further, the charging base 105 may include a first telescoping arm 130a for adjusting an angle of the first solar panel 110a relative to the charging base 105, and a second telescoping arm 130b for adjusting an angle of the second solar panel 110b relative to the charging base 105. FIG. 1 shows the solar panels 110 fully outward (e.g., the telescoping arms 130 fully extended), whereas FIG. 3 shows the solar panels 110 fully inward (e.g., the telescoping arms 130 fully retracted). As such, each of the solar panels 110 may be described as being pivotably coupled to the base 105 of the deployable hybrid solar power charger 100.

In some embodiments, the charging base 105 includes a retractable cord 135 for charging the first rechargeable power supply and/or powering the charging base 105 in place of or in addition to the solar panels 110. The charging base 105 may further include a push button 140 configured to extend or retract the retractable cord 135. A cover 145 may cover the retractable cord 135 when the retractable cord 135 is fully retracted into an interior compartment 150 of the charging base 105 on a rear face 158 of the charging base 105.

The charging base 105 may include a bay 155 (for instance, positioned on a face or a front side of the charging base 105) configured to receive the charging devices 115 such that at least a portion of the charging device 115 is nested in the bay 155. In some embodiments, the bay 155 is sized and positioned to receive the charging device 115 and the electronic device 125 while the charging device 115 is coupled to a charging port of the electronic device 125. As shown in FIG. 3, the bay 155 is sized and positioned to receive two ones of the charging devices 115a, 115b and the electronic device 125 while the charging device 115 is coupled to a charging port (not shown) of the electronic device 125.

As shown in FIG. 1, the charging base 105 may include a triangular shaped body. A front face 162 of the charging base 105 may include one or more power outlets 160a . . . 160n (collectively "power outlets 160"). The power outlets 160 may include at least one of a universal serial bus (USB)

2.0 power outlets (providing 5 V), a USB-C power outlets, and an alternating current (AC) power outlets (providing 220 V), or other suitable power outlet. The charging base comprises a power button 165 and a display 170. Further, the charging base 105 may include processing circuitry (not shown) configured to provide information relating to a charging of the charging device on the display 170.

The charging base 105 may include a first leg 175a extending at an angle from a first side of a body of the charging base 105 and a second leg 175b (collectively "legs 175") extending at an angle from a second side of the body of the charging base 105. The first leg 175a and the second leg 175b are configured to retain the charging base in an upright position, as may be appreciated. In some embodiments, the charging base 105 includes a handle recess 180 positioned on a top portion of the charging base 105 that facilitates carrying the charging base 105.

Figure 8:
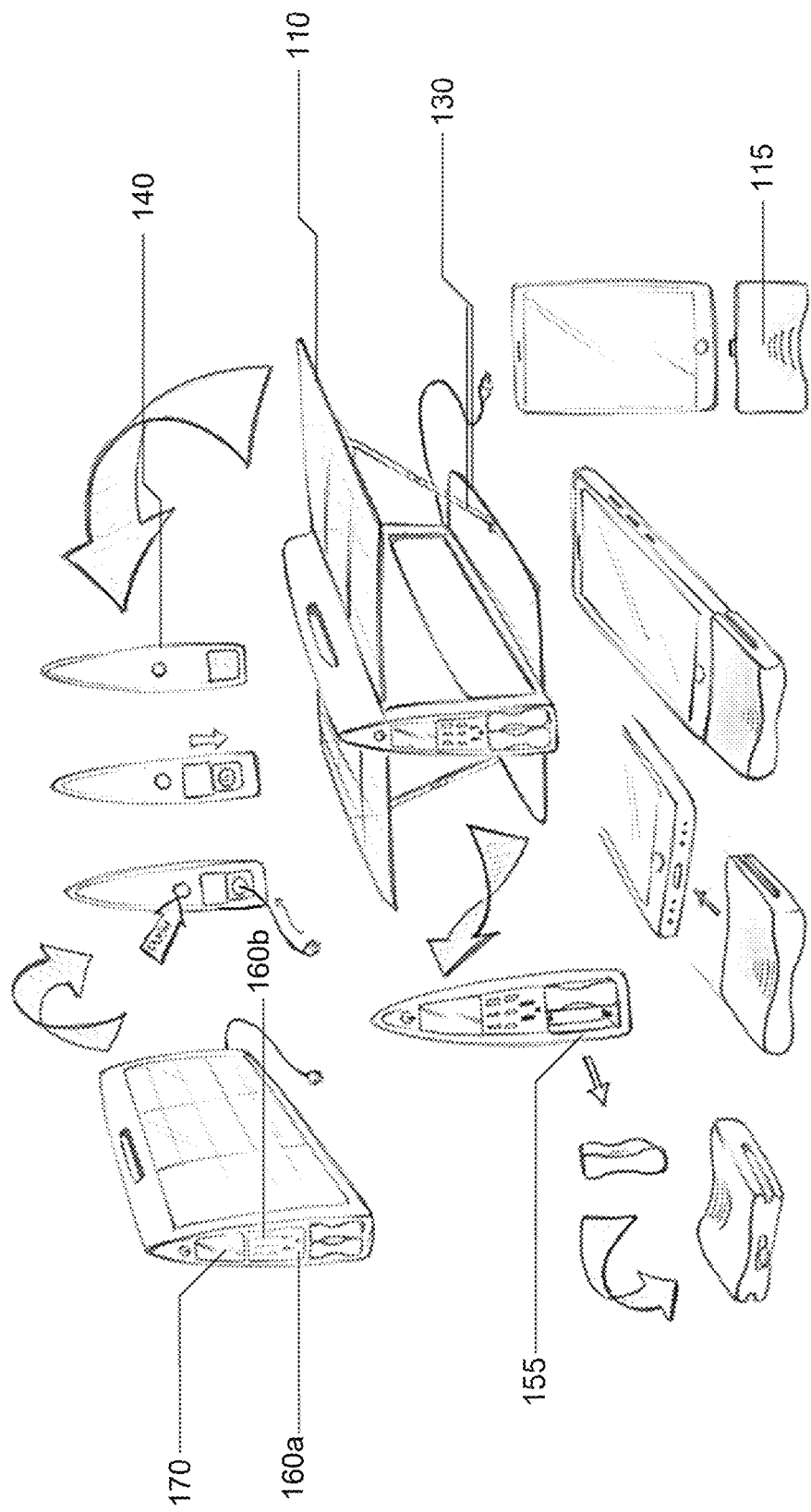
FIG. 8 shows various views of the deployable hybrid solar power charger in accordance with various embodiments of the present disclosure.
Figure 9:
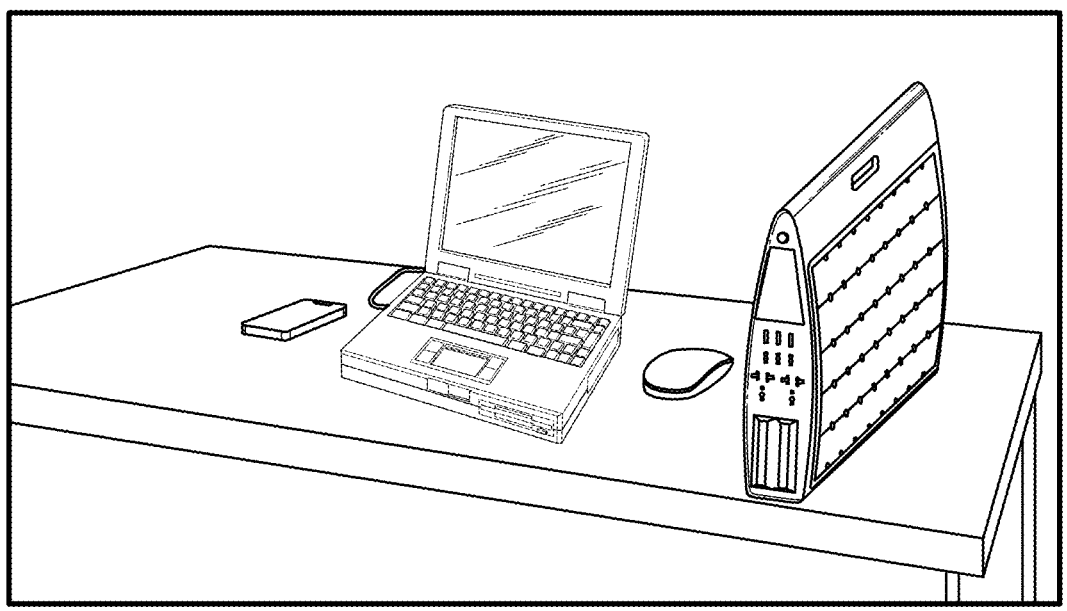
FIGS. 9-13 shows various views of the deployable hybrid solar power charger, or portions thereof, in operation in accordance with various embodiments of the present disclosure.
Figure 10:
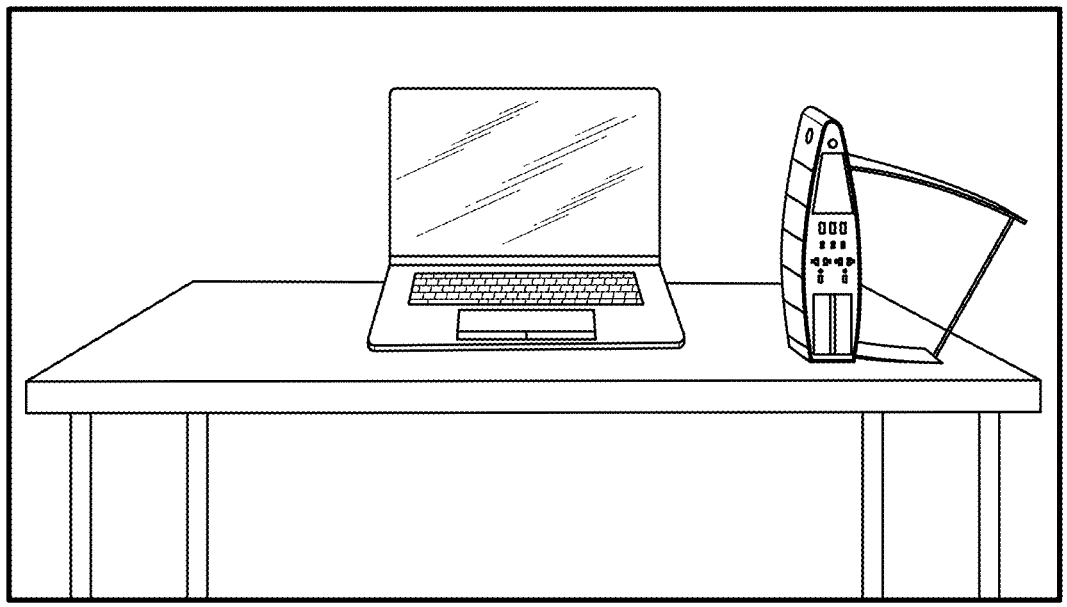
Figure 11:
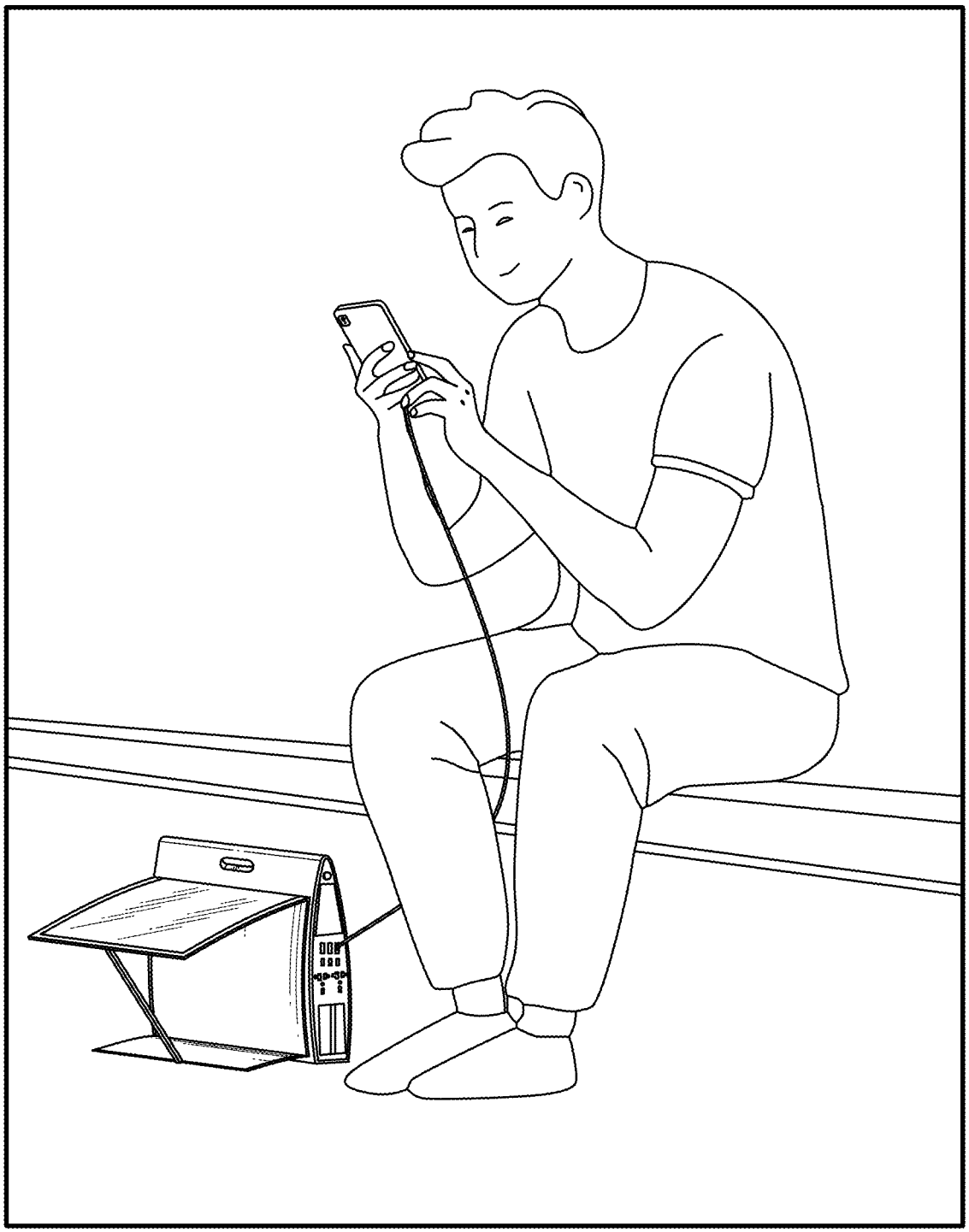
Figure 12:
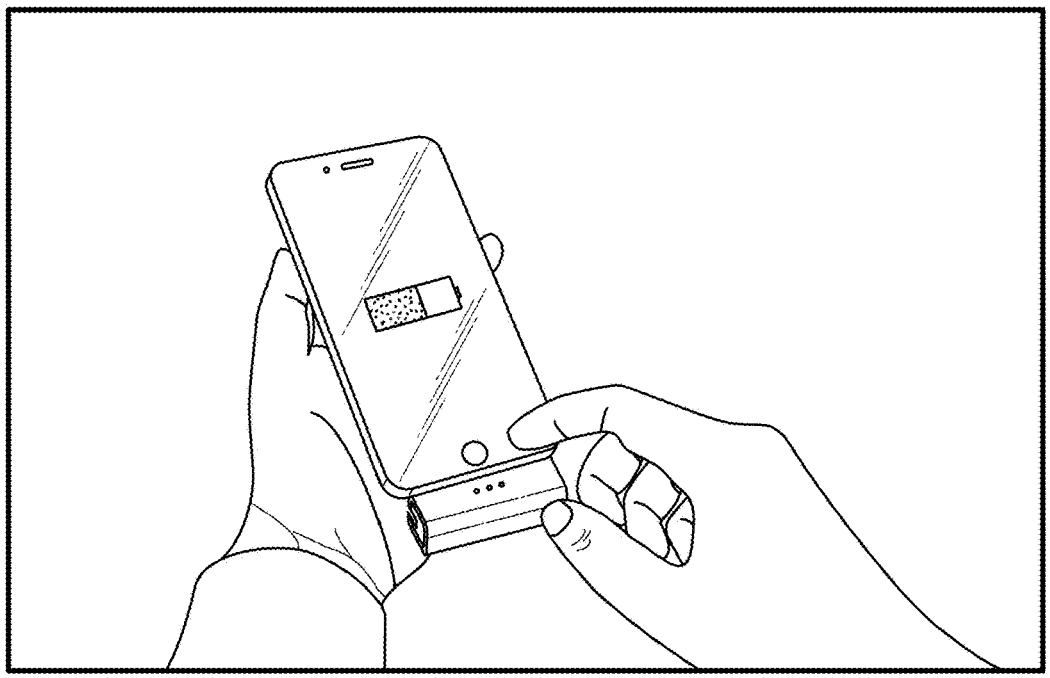
Figure 13:
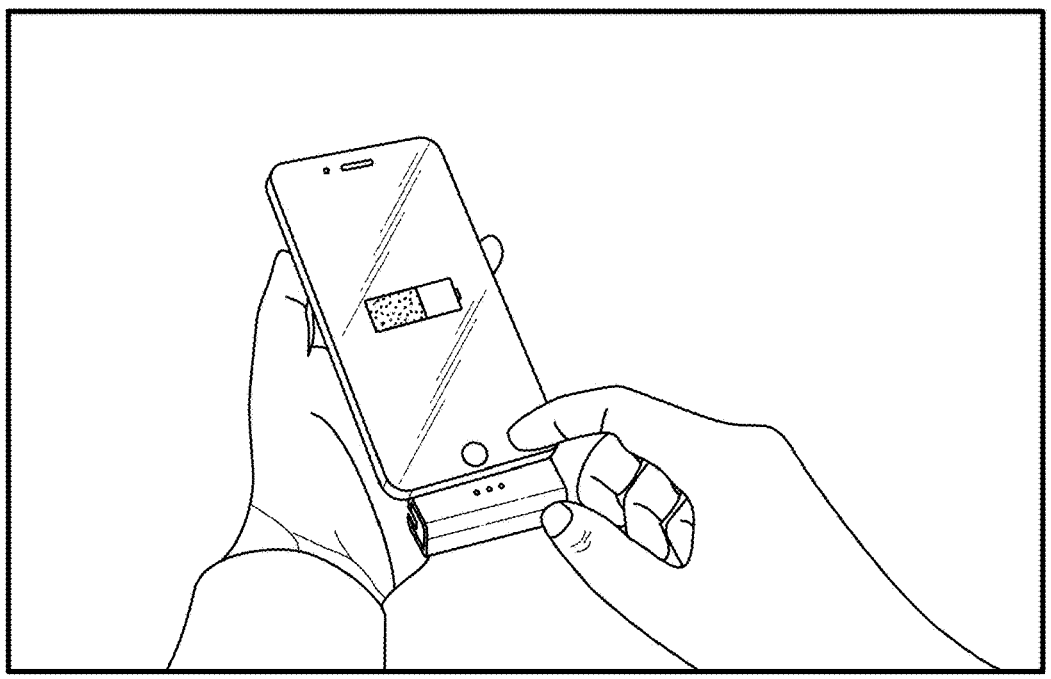

FIG. 8 shows various views of the deployable hybrid solar power charger 100 in accordance with various embodiments of the present disclosure. FIGS. 9-13 shows various views of the deployable hybrid solar power charger 100, or portions thereof, in operation in accordance with various embodiments of the present disclosure.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. The terms "first," "second," etc. are used only as labels, rather than a limitation for a number of the objects.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a charging base, comprising:
a triangular-shaped body with two congruous sides coupled together at a top of the charging base and affixed to a base side at a bottom of the charging base;
a first rechargeable power supply;
a first solar panel pivotably coupled to a first side of the charging base for recharging the first rechargeable power supply;
a second solar panel pivotably coupled to a second side of the charging base for recharging the first rechargeable power supply;
a first telescoping arm for adjusting an angle of the first solar panel relative to the charging base;
a second telescoping arm for adjusting an angle of the second solar panel relative to the charging base;
a retractable cord for charging the first rechargeable power supply and powering the charging base;
a bay configured to receive a removable charging device such that at least a portion of the removable charging device is nested in the bay, wherein the bay is sized and positioned to receive the removable charging device and an electronic device while the removable charging device is coupled to a charging port of the electronic device;
a first leg extending at a first angle from a first side of a body of the charging base and a second leg extending at a second angle from a second side of the body of the charging base, the first leg and the second leg configured to retain the charging base in an upright position; and
a face comprising a plurality of outlets for recharging peripheral devices; and
the removable charging device, the removable charging device being detachably attached to the charging base and comprising a second rechargeable power supply and at least one connector for charging an electronic device, the second rechargeable power supply being different than the first rechargeable power supply.

2. The system of claim 1, wherein the bottom of the charging base is wider than the top of the charging base and the congruous sides of the triangular-shaped body are curved or arched.

3. The system of claim 1, wherein the outlets comprise at least one of: a universal serial bus (USB) 2.0 power outlet; a USB-C power outlet; or an alternating current (AC) power outlet.

4. The system of claim 1, wherein the charging base comprises a display and processing circuitry configured to provide information relating to a charging of the removable charging device on the display.

5. A system, comprising:
a charging base comprising a first rechargeable power supply, at least one solar panel for recharging the first rechargeable power supply, and a triangular-shaped body with two congruous sides coupled together at a top of the charging base and affixed to a base side at a bottom of the charging base; and
a charging device detachably attached to the charging base, the charging device comprising a second rechargeable power supply and at least one connector for charging an electronic device, the second rechargeable power supply being different than the first rechargeable power supply.

6. The system of claim 5, wherein the at least one connector for charging the electronic device is adapted to charge a mobile phone or tablet.

7. The system of claim 5, wherein the at least one solar panel is a first solar panel positioned on a first side of the charging base and a second solar panel positioned on a second side of the charging base, the second side being different than the first side.

8. The system of claim 7, wherein:
the first solar panel is pivotably coupled to the first side of the charging base;
the second solar panel is pivotably coupled to the second side of the charging base;
the charging base further comprises a first telescoping arm for adjusting an angle of the first solar panel relative to the charging base; and
the charging base further comprises a second telescoping arm for adjusting an angle of the second solar panel relative to the charging base.

9. The system of claim 5, wherein the charging base comprises a retractable cord for charging the first rechargeable power supply and powering the charging base.

10. The system of claim 9, wherein the charging base further comprises a push button configured to extend or retract the retractable cord.

11. The system of claim 5, wherein the charging base comprises a bay configured to receive the charging device such that at least a portion of the charging device is nested in the bay.

12. The system of claim 11, wherein the bay is sized and positioned to receive the charging device and the electronic device while the charging device is coupled to a charging port of the electronic device.

13. The system of claim 11, wherein the bay is sized and positioned to receive two charging devices and the electronic device while the charging device is coupled to a charging port of the electronic device.

14. The system of claim 5, wherein the bottom of the charging base is wider than the top of the charging base and the congruous sides of the triangular-shaped body are curved or arched.

15. The system of claim 5, wherein the charging base comprises a face comprising a plurality of power outlets.

16. The system of claim 15, wherein the power outlets comprise at least one of: a universal serial bus (USB) 2.0 power outlet; a USB-C power outlet; or an alternating current (AC) power outlet.

17. The system of claim 5, wherein the charging base comprises a display and processing circuitry configured to provide information relating to a charging of the charging device on the display.

* * * * *